United States Patent [19]
Bitner et al.

[11] Patent Number: 5,894,630
[45] Date of Patent: Apr. 20, 1999

[54] AIR CONDUCTING CONVERTOR FOR STRING TRIMMER

[75] Inventors: Hubert E. Bitner, Plano, Tex.; William A. Brown, Rancho Murieta, Calif.

[73] Assignee: International Retail Direct Promotions, Inc., Rancho Murieta, Calif.

[21] Appl. No.: 08/616,441

[22] Filed: Mar. 15, 1996

[51] Int. Cl.$^6$ ................................................. A47L 5/14
[52] U.S. Cl. ...................... 15/330; 15/344; 15/405
[58] Field of Search ........................ 15/328, 330, 344, 15/405; 29/401.1; 30/122; 56/2, 12.1, 12.8

[56]  References Cited

U.S. PATENT DOCUMENTS

| | | | |
|---|---|---|---|
| 1,940,609 | 12/1933 | Simpson | 15/344 |
| 2,983,057 | 5/1961 | Erickson . | |
| 3,142,913 | 8/1964 | Jacob . | |
| 3,995,348 | 12/1976 | Chernosky . | |
| 4,132,507 | 1/1979 | Akiyama et al. | 15/405 |
| 4,187,577 | 2/1980 | Hansen et al. . | |
| 4,227,280 | 10/1980 | Comer . | |
| 4,242,794 | 1/1981 | Peterson . | |
| 4,404,706 | 9/1983 | Loyd | 15/344 |
| 4,413,371 | 11/1983 | Tuggle et al. | 15/405 |
| 4,827,702 | 5/1989 | Cerreta . | |
| 4,835,950 | 6/1989 | Cerreta . | |
| 5,245,726 | 9/1993 | Rote et al. | 15/405 |

FOREIGN PATENT DOCUMENTS

| | | | |
|---|---|---|---|
| 2499394 | 8/1982 | France | 15/344 |
| 2199487 | 7/1988 | United Kingdom | 15/415.1 |

OTHER PUBLICATIONS

Weed Eater Operator's Manual (Copyright 1988) Poulan/Weed Eater, Division of White Consolidated Industries, Inc. Shreveport, LA 71139.

*Primary Examiner*—Terrence Till
*Attorney, Agent, or Firm*—Joseph E. Gerber

[57] ABSTRACT

An air conducting convertor for a powered string trimmer is disclosed, wherein the trimmer to be converted has a power shaft with opposing proximal and distal ends, a power-providing unit disposed upon the proximal end thereof, and a string head coupling disposed on the distal end thereof. The converting apparatus includes a collar bracket adjacent the distal end of the trimmer, and struts projecting from the collar bracket and supporting a surrounding fan shroud. A fan having blades pitched to move air distally through the shroud is coupled with the trimmer's standard trimmer head coupling. A curved, rotatable air duct with interior baffle plates is engaged with the shroud and projects distally therefrom. A debris bag is suspended from the trimmer's shaft has a collector portion which is engaged with the proximal rim of the fan shroud, so when a fan pitched to move air proximally is mounted on the trimmer, the apparatus is able to act as a vacuum. A caster supports the apparatus above a surface in both the blowing and vacuum modes.

22 Claims, 10 Drawing Sheets

AIR CONDUCTING CONVERTOR FOR STRING TRIMMER

BACKGROUND OF THE INVENTION

1. Field Of The Invention

The present invention relates generally to hand-held, powered machinery for cutting vegetation, and more specifically to apparatus for converting string trimmers to perform other yard care functions.

2. Description Of The Related Art

It has long been recognized that great economy and efficiency are possible when a device can be put to multiple uses. This concept has been applied liberally to powered yard care machines of the type such as small tractors, and the like, which have a power take-off able to be coupled with various apparatus for performing different tasks. In other cases, machines initially intended to be used for a single purpose are retrofitted with apparatus for performing auxiliary functions. In relation to the vegetation cutting arts, specifically, lawn mowers have a long history of use as the power-providing units for various add-on apparatus. For example, as most lawn mowing jobs leave undesirable clippings and debris on adjacent surfaces around lawn edges, numerous different blowing and vacuuming convertors for lawn mowers have been developed. Specific examples include: U.S. Pat. No. 2,983,057 issued to Erickson in 1961 for a blower attachment for a lawn mower; and, U.S. Pat. No. 3,995,348 issued to Chernosky in 1976 for a vacuum cleaner attachment for a lawn mower. And, see U.S. Pat. No. 3,142,913 issued to Jacob in 1964 for a snow blower attachment for a lawn mower. However, the maneuverability, and therefore the usefulness, of a conventional lawn mower is limited by its size, despite the versatility it might offer with access to a full range of auxiliary attachments.

The need for more nimble blowing and vacuuming apparatus for yard care spawned single-purpose, powered, units in hand-held and backpack styles. But, various drawbacks such as excessive noise, weight and cost, and especially lack of multi-function adaptability, keep these from being suited to all purposes.

Likewise, the need for more nimble grass and weed cutting and trimming apparatus fueled the popularity of powered string trimmers, and the like. And, the availability of a convenient power take-off on such hand-held devices, expectedly, spurred development of string trimmer add-on apparatus for serving other yard care purposes. Blowing and vacuuming apparatus are as useful after a trimming job as they are after lawn mowing, so various air-conducting devices exploiting the ready availability of a trimmer's easily accessible power take-off appeared. And, these have some advantages over dedicated blowing and vacuuming apparatus. For example, see U.S. Pat. Nos. 4,827,702 and 4,835,950 issued to Cerreta in 1989 which show circular collars which fit over string trimmer heads and have multiple fan blades projecting therefrom. However, Cerreta's blades, although resilient, would likely subject the user and bystanders to injury upon contact therewith, simply because of the high speeds achievable by string trimmer drive units. Further, for fans such as those in Cerreta to move significant volumes of air, their blade would likely need to project both axially and radially beyond the standard blade shield or guard of a conventional trimmer. Again, this subjects the user and bystanders to risks of injury.

Peterson, in U.S. Pat. No. 4,242,794 issued in 1981, and Hansen, in U.S. Pat. No. 4,187,577 issued in 1980, show add-on, centrifugal-style fan housings for electric string trimmers. Each employs an axial intake, and a tangentially-oriented output nozzle which discharges air in the same plane as the fan, parallel to the ground. However, considering the conventional electric trimmer's handle shape and end grip, the extra weight the Peterson and Hansen blowers would add to an electric trimmer's motor housing would likely make such combined apparatus very awkward to wield. And, using either to direct air in any direction other than parallel to the ground would present difficulty. Further, neither Peterson nor Hansen disclose a vacuum mode.

Comer, in U.S. Pat. No. 4,227,280 issued in 1980 shows an electric trimmer convertor capable of both vacuuming and blowing functions. Comer, as above, employs a centrifugal fan, axial intake and tangentially-oriented output. And, to switch between its blower and vacuum modes, Comer's apparatus must be removed, rotated and replaced in a different orientation. Comer's apparatus vividly highlights the functional limits of its genera by its inclusion of wheels and other accoutrements reminiscent of converted conventional lawn mowers.

The blower devices of Peterson and Hansen, and especially the blower/vacuum of Comer, are exceedingly complex for the functions they perform, and are likely to be unreasonably expensive to manufacture at a sufficient level of quality to meet consumers' expectations.

Thus, it appears that a need exists for much safer apparatus than that shown in the Cerreta patents for converting a string trimmer to a blower. And, vacuuming capability would also be desirable, but not at the expense of greatly increased weight and loss of maneuverability. Yet further, such apparatus should be easy to install and remove, and inexpensive to manufacture.

SUMMARY OF THE INVENTION

The air conducting string trimmer convertor of the present invention is adapted to overcome the above-noted shortcomings and to fulfill the stated needs. It departs from the prior thinking in that it employs a gasoline engine-powered trimmer as the power-providing unit, and thereby gains the advantage of employing the butt-mounted engine to counterbalance the weight of the blower/vacuum apparatus. This results in a nimble, easily-wieldable appliance.

In essence, the gasoline-powered string trimmer to be converted includes a power shaft with opposing proximal and distal ends, the engine being disposed upon the proximal end thereof, and a string head coupling being disposed on the distal end thereof. This coupling is exposed by removing the trimmer's standard cutting head and scatter shield. The convertor includes: an air-propelling fan engageable with the coupling at the shaft's distal end; a shroud around the fan; struts for supporting the fan shroud coaxially on the shaft; and, a rotatable air duct, the proximal portion of which is engaged with the fan shroud on a common axis therewith. The air duct has a curved distal portion which, when rotated with respect to the shroud, directs air through the duct in different directions radial to the aforementioned common axis.

Air flow is directed distally in a blower mode, and proximally in a vacuum mode, either of these modes being selectable by choosing from one of a pair of fans having oppositely-pitched blades. Between the two fan configurations, conversion of both clockwise and counter-clockwise-rotating string trimmer drives to either the blower mode or vacuum mode may be effected.

In the vacuum mode, a debris bag is applied proximal to the fan shroud to collect debris drawn up through the duct and fan housing in a proximal direction. The debris bag includes a collector portion which engages the fan shroud, covers the struts and seals around the shaft adjacent the struts. The debris bag also has a receptacle portion suspended from a point along the shaft's mid-length.

Thus, it is an object of the present invention to provide apparatus for converting a string trimmer to a blower and a vacuum, which is simple and inexpensive in its construction.

Another object of the present invention is to provide such blowing and vacuuming apparatus which is easy to install and remove, as needed.

Yet another object of this invention is to provide such blowing and vacuuming apparatus which is easy to switch between its blowing mode and its vacuuming mode.

It is a further object of the invention to provide such blowing and vacuuming apparatus which is easy to wield and control in both its blowing mode and its vacuuming mode.

Yet a further object of the present invention is to provide such blowing and vacuuming apparatus which is safe to operate.

Still a further object of the present invention is to provide apparatus for converting a gasoline-powered string trimmer, having a butt-mounted engine, to a blowing and vacuuming appliance.

Still another object of the present invention is to provide apparatus for converting a string trimmer to a blower and a vacuum, wherein the simplicity and reliability of an axial fan are employed, along with the high-R.P.M. capability of a gasoline engine-powered string trimmer.

And it is also an object of the present invention to provide blowing and vacuuming apparatus having a debris receptacle which is exceedingly easy to install, as well as to remove and empty.

Still further objects of the inventive apparatus disclosed herein will be apparent from the drawings and following detailed description thereof.

DESCRIPTION OF THE PREFERRED EMBODIMENT

Figure 1:
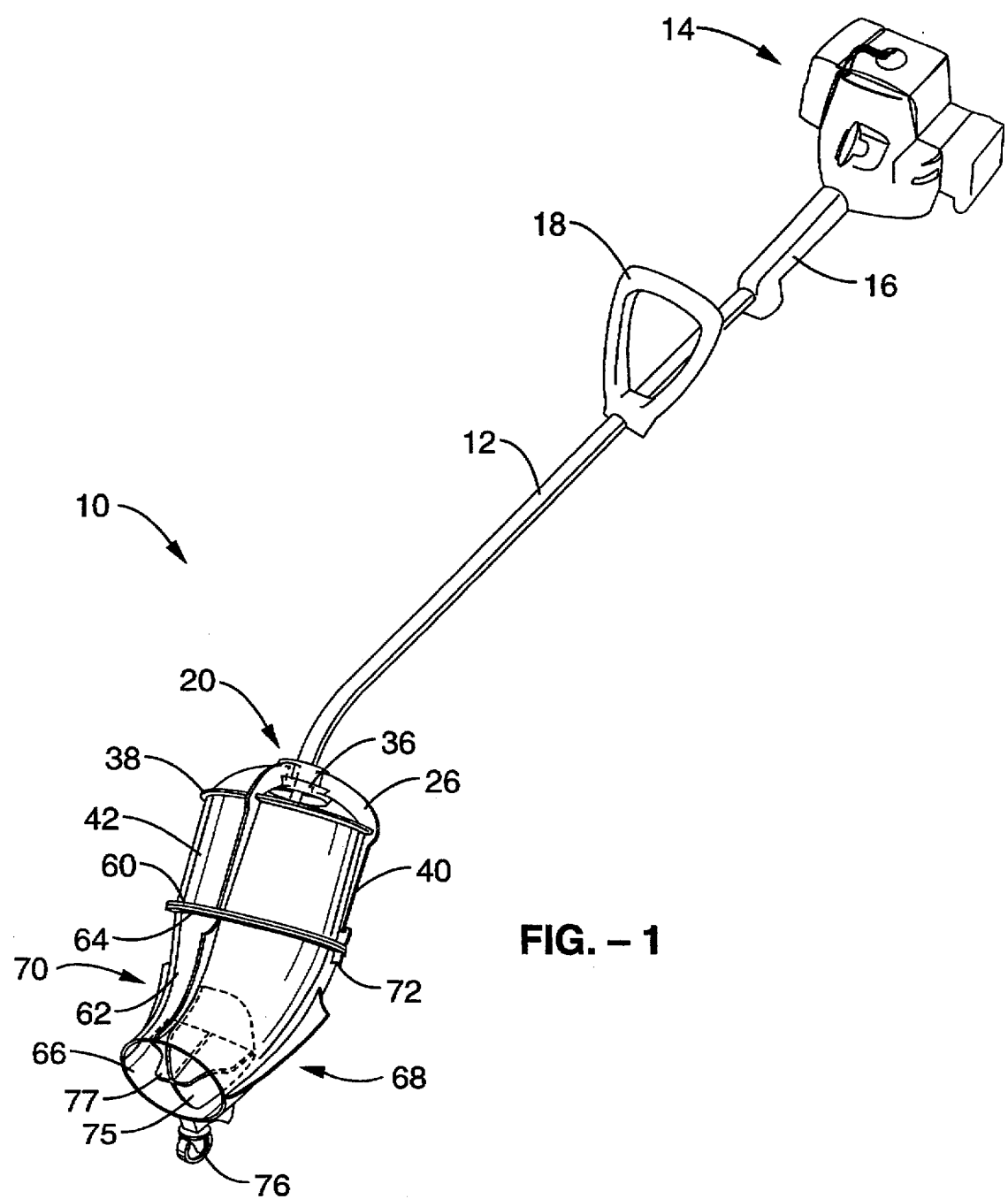
FIG. 1 is a perspective view of the air conducting convertor of the invention in place on the distal end of a gasoline-engine powered string trimmer, the apparatus being shown in its blower mode.
Figure 11:
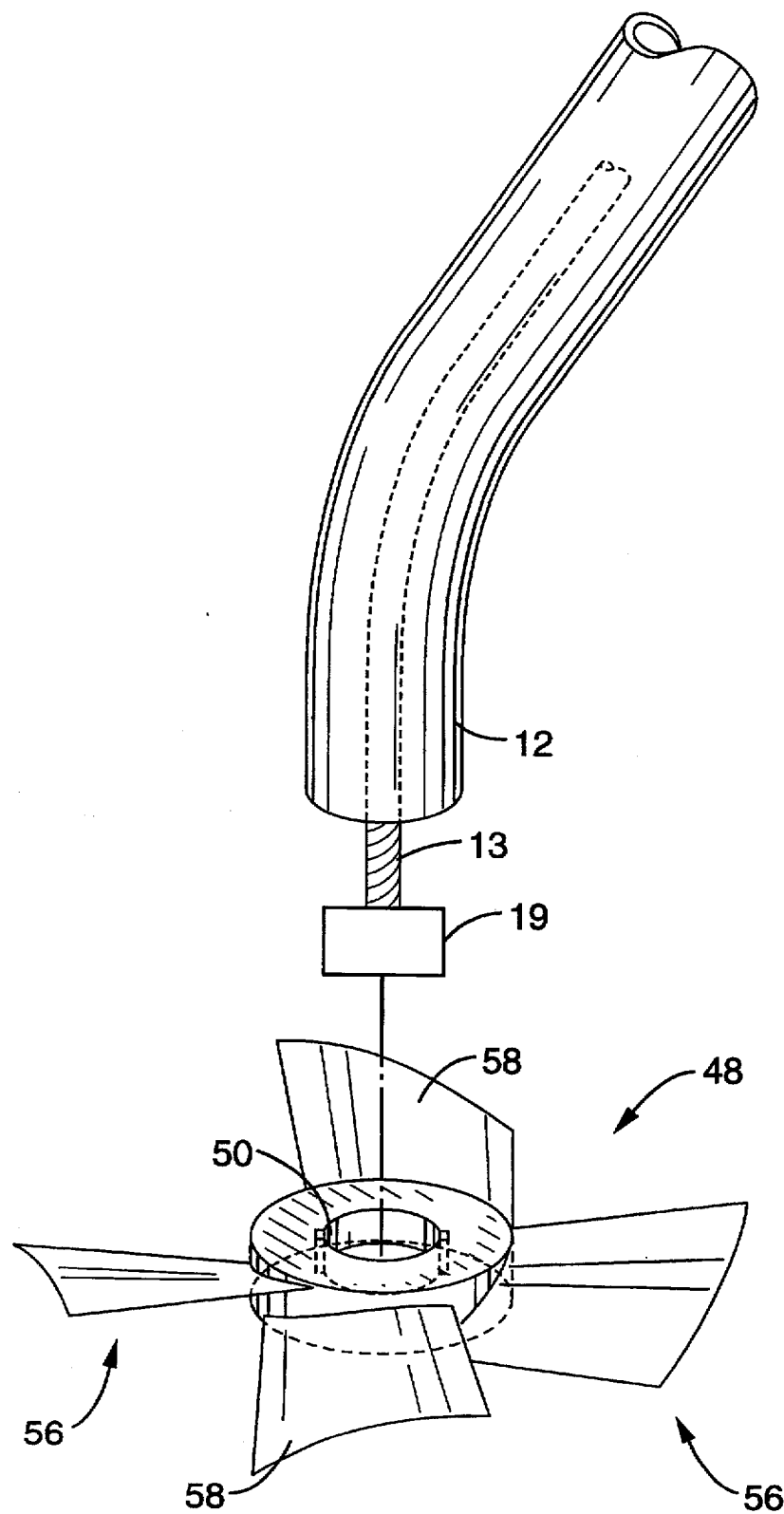
FIG. 11 is an exploded perspective view of the distal end of a string trimmer's power shaft housing, projecting power shaft and trimmer head coupling, showing a fan as it engages the coupling, the coupling being represented by a labeled rectangular box.

Referring now specifically to the drawings, FIG. 1 shows the blower mode of the inventive apparatus, which is an air conducting string trimmer convertor, and which is generally identified herein with the reference numeral 10. As blower 10 employs the frame and drive system of a string trimmer, standard string trimmer elements of blower 10 include power shaft housing 12, flexible power shaft 13, engine 14, proximal handle 16 and distal handle 18. Shaft housing 12 is generally linear from its proximal end where engine 14 is mounted, through adjacent proximal handle 16 and distal handle 18, and through its mid-length. The distal end of shaft housing 12 is curved in the embodiment of blower 10 shown, although, as noted herein below, straight-shafted string trimmer shafts may be accommodated by applying slight alterations within the skill in the art, to the preferred structure disclosed herein. Flexible shaft 13 carries rotational power through shaft housing 12 and projects from housing 12 as shown in FIG. 11. Flexible shaft 13 is coupled to string head coupling 19. Head coupling 19 is depicted here simply as a labeled rectangular box.

Throughout the following disclosure, the convention of referring to the relative disposition of elements as proximal or distal shall be with reference to engine 14 situated at the butt-end of shaft housing 12. Thus, elements closer to engine 14 are proximal, while elements farther from engine 14 are distal.

Figure 3:
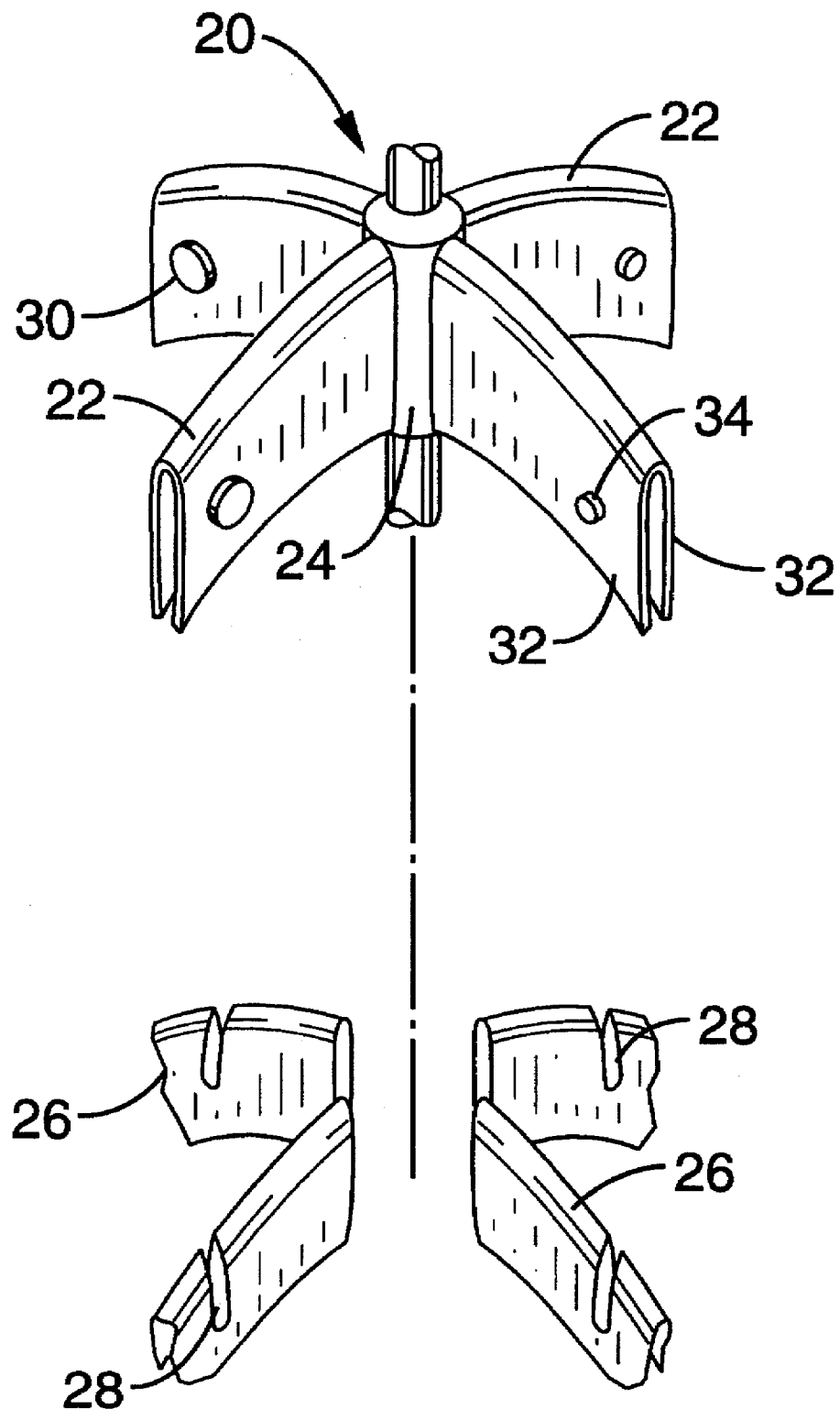
FIG. 3 is an exploded perspective view of the collar bracket and manner of attachment of the fan shroud supporting struts.
Figure 4:
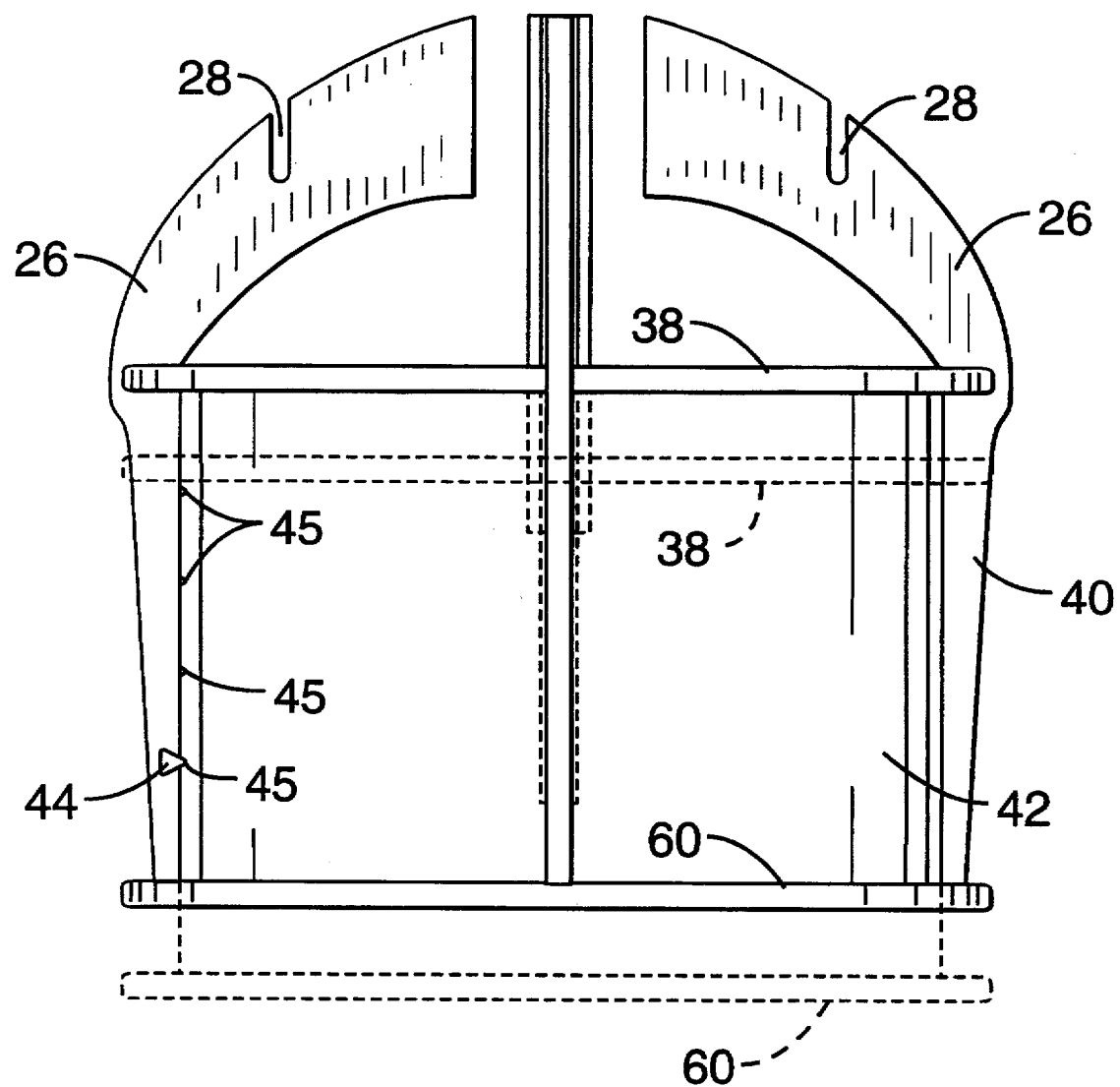
FIG. 4 is a side elevation of a fan shroud and shroud support struts wherein the struts are adjustable with respect to the shroud in a direction parallel with the shroud's axis.

As shown in FIG. 3, collar bracket 20 is generally cruciform in shape. Collar bracket 20 may be formed and affixed to shaft housing 12 in any manner known in the art. Four formed sheet metal mounting projections 22 diverge from central cylinder 24 of collar bracket 20.

Four struts 26 project from mounting projections 22 of collar bracket 20, the proximal end of each strut 26 having a slot 28 for receiving a threaded shaft (not shown) projecting from thumb screw 30. Each thumb screw 30's shaft spans the opposing leaves 32 of its mounting projection 22 and engages a fixed nut 34 or like fixture which permits leaves 32 to bear against strut 26's proximal end.

The apparatus also preferably includes a generally circular safety guard 36 which has a radius roughly half that of the proximal rim 38 of cylindrical fan shroud 42. Safety guard 36 is affixed to the inner edges of struts 26, and may be integral therewith.

Fan shroud 42 is rigid and cylindrical, and supported in concentric, surrounding relation to shaft housing 12 by the distal ends 40 of struts 26. Any secure engagement therebetween will suffice. However, in order to accommodate different shaft curves produced by different manufacturers, the distal ends of struts 26 may be selectively engaged with shroud 42 at various different points along lines on shroud 42's outer surface parallel to shroud 42's axis. Any removable and replaceable fasteners such as screws 44 may be used to engage struts 26 with shroud 42. Such selective positioning of struts 26 with respect to shroud effectively permits shroud to be positioned closer to, or farther away from, collar bracket 20.

Depending on whether the string trimmer employed is of the clockwise-drive type, or of the counter-clockwise-drive type, either fan 46 or fan 48 is coupled, at the distal end of flexible power shaft 13, to trimmer head coupling 19 with coupling bolt 17.

Figure 5:
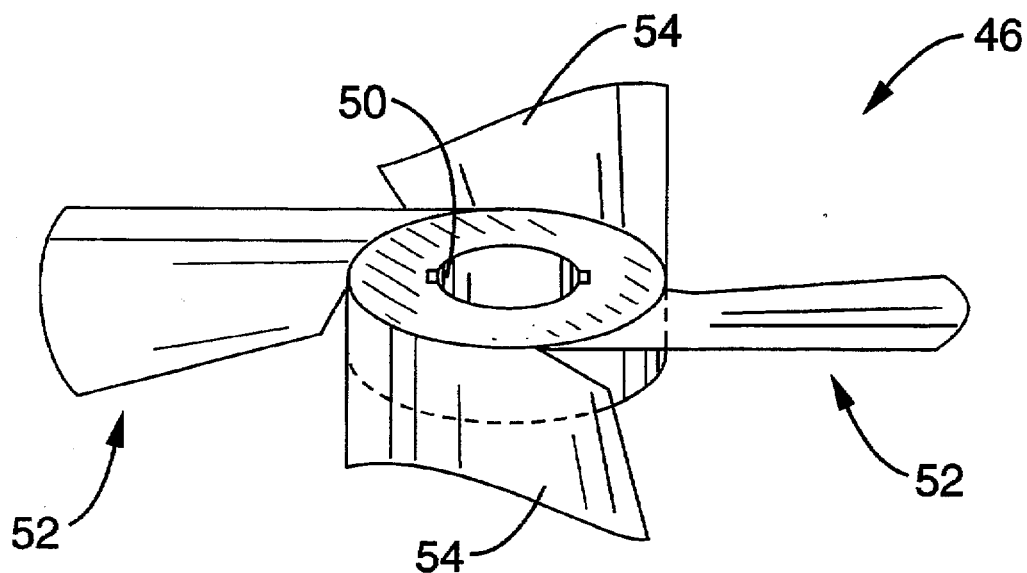
FIG. 5 is a perspective view of a fan for converting a clockwise-drive string trimmer to a blower, or for converting a counter-clockwise-drive string trimmer to a vacuum.
Figure 6:
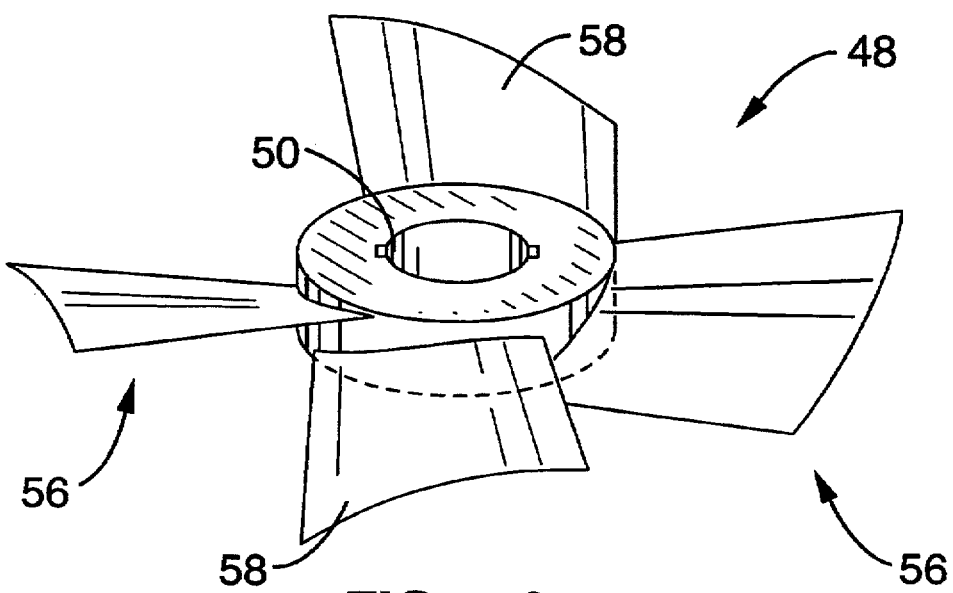
FIG. 6 is a perspective view of a fan for converting a clockwise-drive string trimmer to a vacuum, or for converting a counter-clockwise-drive string trimmer to a blower.

FIG. 5 is an illustration of fan 46 which is for converting a clockwise-drive string trimmer to a blower, while FIG. 6 is an illustration of fan 48 which is for converting a counter-clockwise-drive string trimmer to a blower. Fans 46 and 48 have central coupling hubs 50 equivalent to standard string trimmer head couplings, and maximum diameters across their blades which permit them to rotate freely within fan shroud 42. Fan 46's blades 52 are pitched to drive air in the direction of the pitch, i.e. distally, and away from its proximal face 54, when rotated in a clockwise direction. Conversely, fan 48's blades 56 are pitched to drive air distally, away from its respective proximal face 58, when rotated in a counter-clockwise direction. And, as will appear more fully below, either fan, when inverted and rotated in the opposite direction, will drive air proximally.

Figure 7:
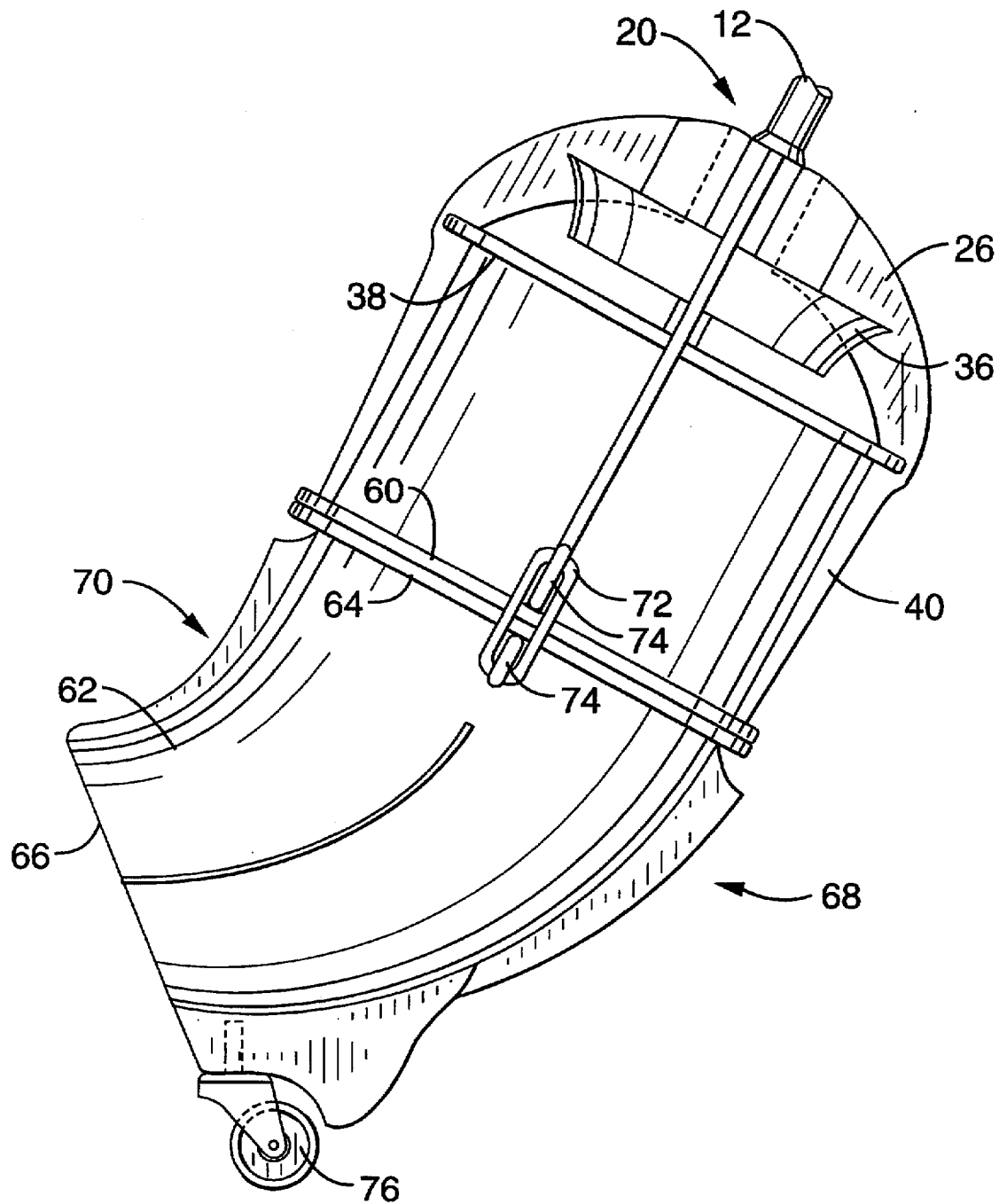
FIG. 7 is an enlarged side elevation of the fan shroud and curved air duct, showing the orientation of the duct and caster when the apparatus is in its blower mode.

Fan shroud 42's distal rim 60 mates with a somewhat flexible, curved air duct 62, as shown in FIG. 7. Curved air duct 62 is generally frusto-conical, having a generally circular proximal rim 64 of the same diameter as fan shroud 42's distal rim 60. Curved air duct 62's distal rim 66 is also generally circular, although the plane across distal rim 66 is not parallel to the plane across duct 62's proximal rim 64. This causes the length of duct 62's surface between proximal and distal rims 64 and 66 to be greater along one side than the other, the longer side being identified herein with reference numeral 68, and the shorter side being identified herein with reference numeral 70.

Resilient bands 72 engaged with opposing hooks 74 adjacent fan shroud 42's distal rim 60, and adjacent curved air duct 62's proximal rim 64, keep fan shroud 42 and curved air duct 62 mated with one another.

A caster 76 able to swivel through a 360° arc is mounted adjacent distal rim 66 of curved air duct 62, on long side 68 thereof. The axis about which caster 76 swivels is approximately parallel to the plane across distal rim 66. Caster 76 is preferably oval in cross-section As can be seen in FIG. 7, when curved air duct 62 is lowered toward a surface, and when the plane of distal rim 66 is oriented generally perpendicularly with respect to that surface, caster 76 engages the surface and supports curved air duct 62 and the entire distal end of blower 10. Thus, in blower mode, blower 10's curved air duct 62 directs air in a distal direction, generally parallel to a surface across which it can be guided, while supported on caster 76.

Figure 8:
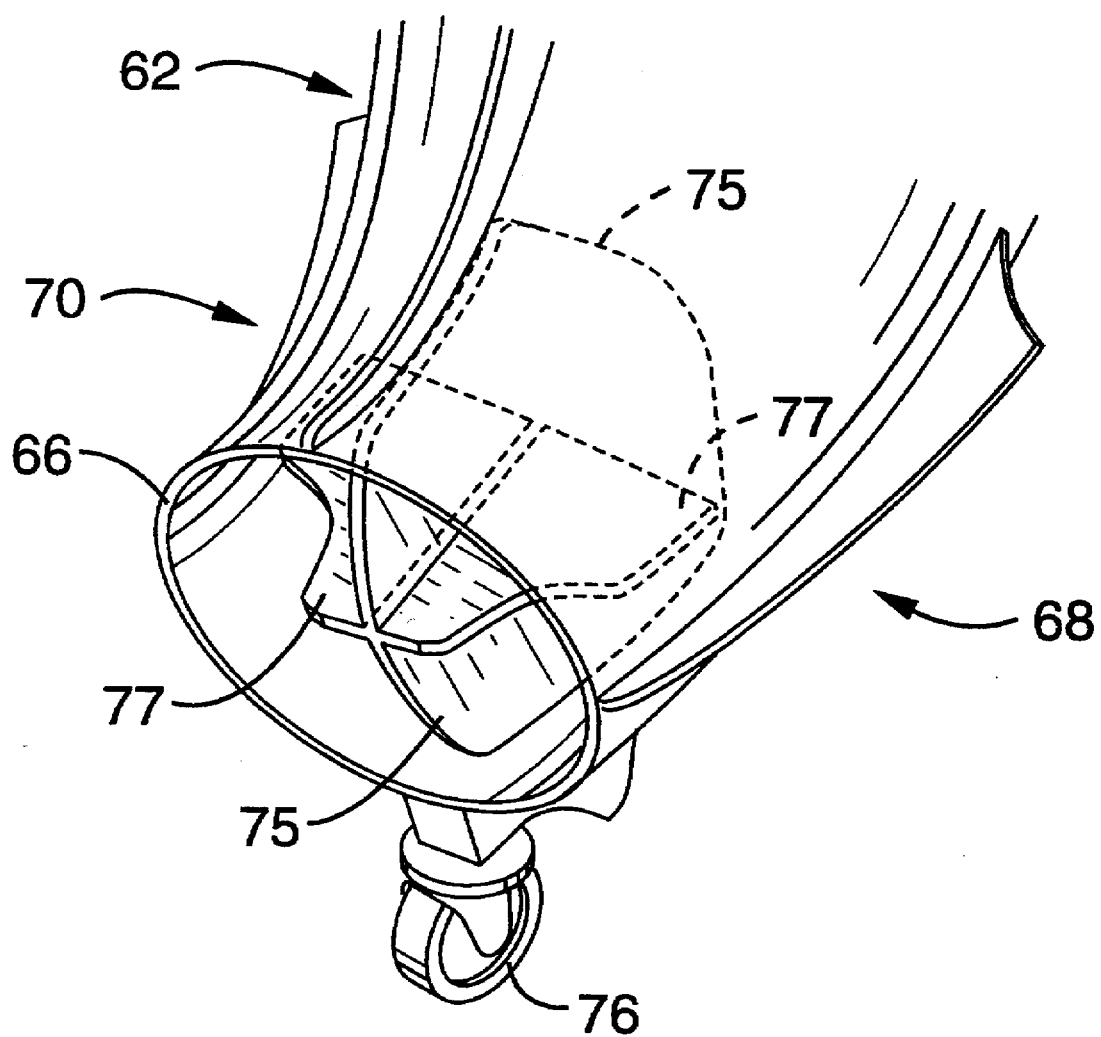
FIG. 8 is an enlarged perspective of the distal end of the curved air duct showing the air directing baffle plates.

Experience shows that, unless corrected, air delivered by blower 10 has a tendency to follow a spiral and somewhat laterally-curving path as it passes beyond distal rim 66 of curved air duct 62. This reduces precision in directing air from blower 10. To correct this, as shown in FIG. 8, first and second air-directing baffle plates 75 and 77, respectively, are disposed in perpendicular relation to one another in curved air duct 62's distal end. Plates 75 and 77 permit duct 62 to deliver a relatively linear stream of air, as they are disposed parallel to the desired direction of air flow. They also act as a structural skeleton for duct 62, reducing the likelihood of its collapsing in response to lateral force, for example, if leaned upon.

Figure 9:
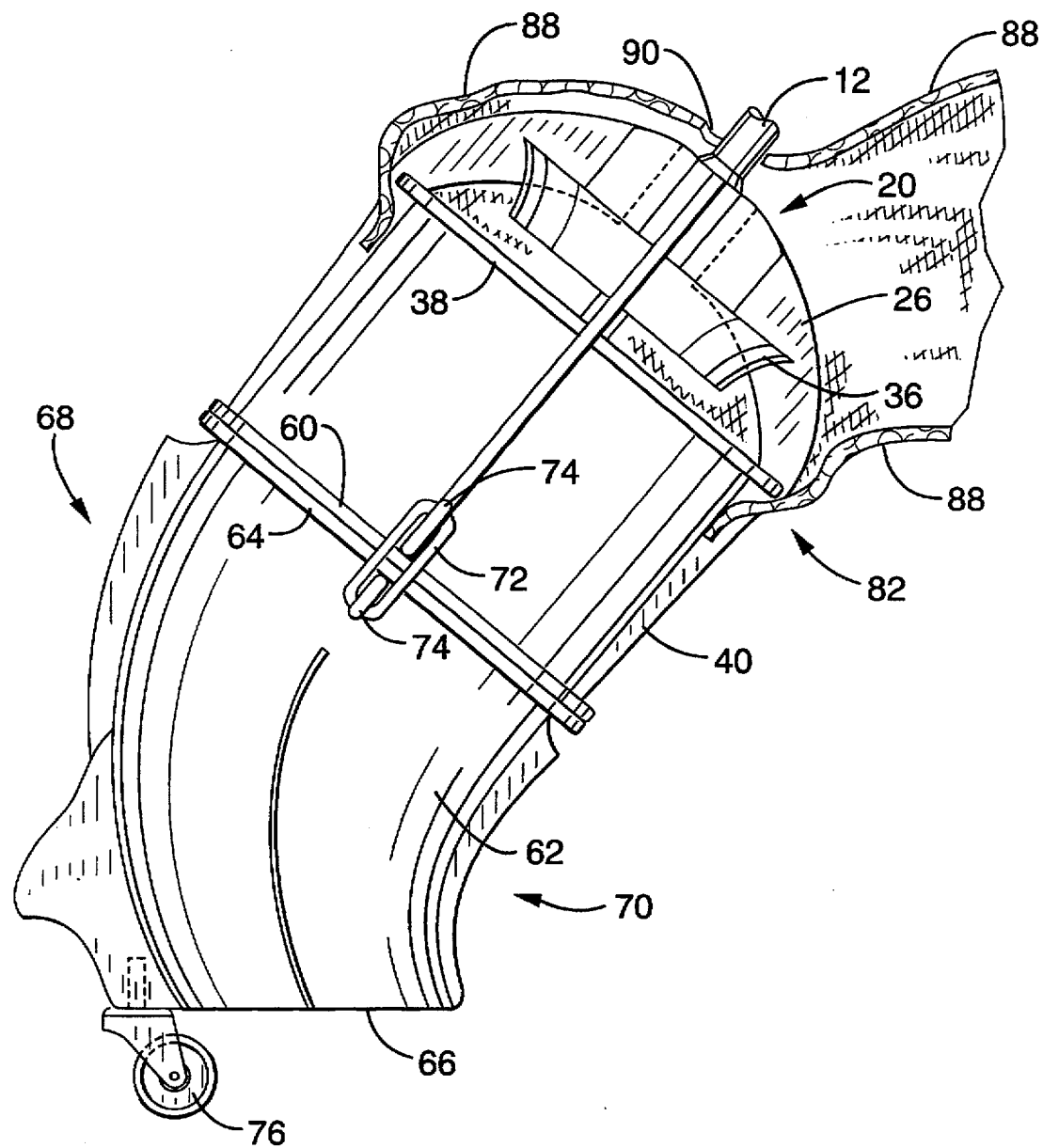
FIG. 9 is a side elevation of the fan shroud and curved air duct, showing the orientation of the duct and caster when the apparatus is in its vacuum mode.

FIG. 9 shows that curved air duct 62 is able to be rotated 180° with respect to, and on its proximal portion's common axis with, fan shroud 42. When so rotated, hooks 74 at curved air duct 62's proximal rim 64 align, again, with opposing hooks 74 on fan shroud 42's distal rim 60, thereby permitting engagement of resilient bands 72 for securing curved air duct 62 and fan shroud 42 with respect to one another. This is the orientation employed in the apparatus' vacuum mode 78, depicted in FIG. 2.

Due to the curve at the distal end of air duct 62, such rotation thereof also changes the radial direction of air flow at its distal end. This is to be distinguished from the change of air flow from a distal to a proximal direction effected by changing fan shapes to switch between blower and vacuum modes, 10 and 78.

When switching to vacuum mode, the fan blade pitch must also be switched to cause air to be drawn in a proximal direction. Thus, after detaching curved air duct 62 from shroud 42, and before rotation and reattachment thereof, the remaining fan, either 46 or 48 of FIGS. 5 and 6, must be substituted for the fan already in place. And, it must be assured that, in installing this remaining fan, it is oriented with its blades pitched in a proximal direction. When so oriented, and driven in the same direction as the first fan was driven, the remaining fan will move air proximally.

As shown in FIG. 9, when the apparatus is switched from blower mode 10 to vacuum mode 78, caster 76 is moved to a second position on curved air duct 62's distal rim 66, which causes caster 76 to project distally beyond rim 66. Thus, when curved air duct 62 is lowered toward a surface in vacuum mode 78, and when the plane of distal rim 66 is oriented generally parallel with respect to that surface, caster 76 engages the surface and supports curved air duct 62 a short distance above it.

Figure 2:
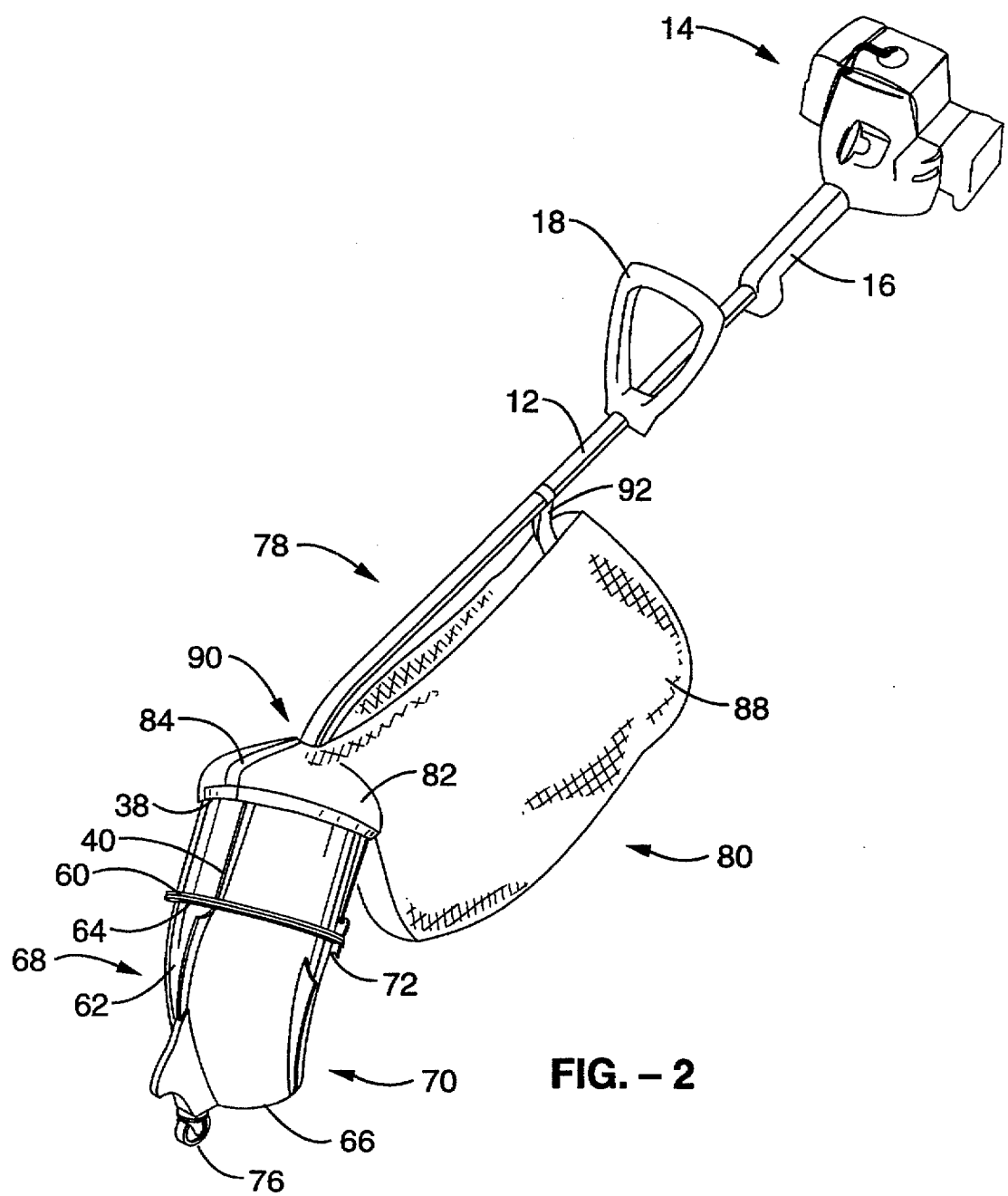
FIG. 2 is a perspective view of the apparatus of FIG. 1, the apparatus being shown in its vacuum mode with a debris bag suspended from the mid-length of its shaft.
Figure 10:
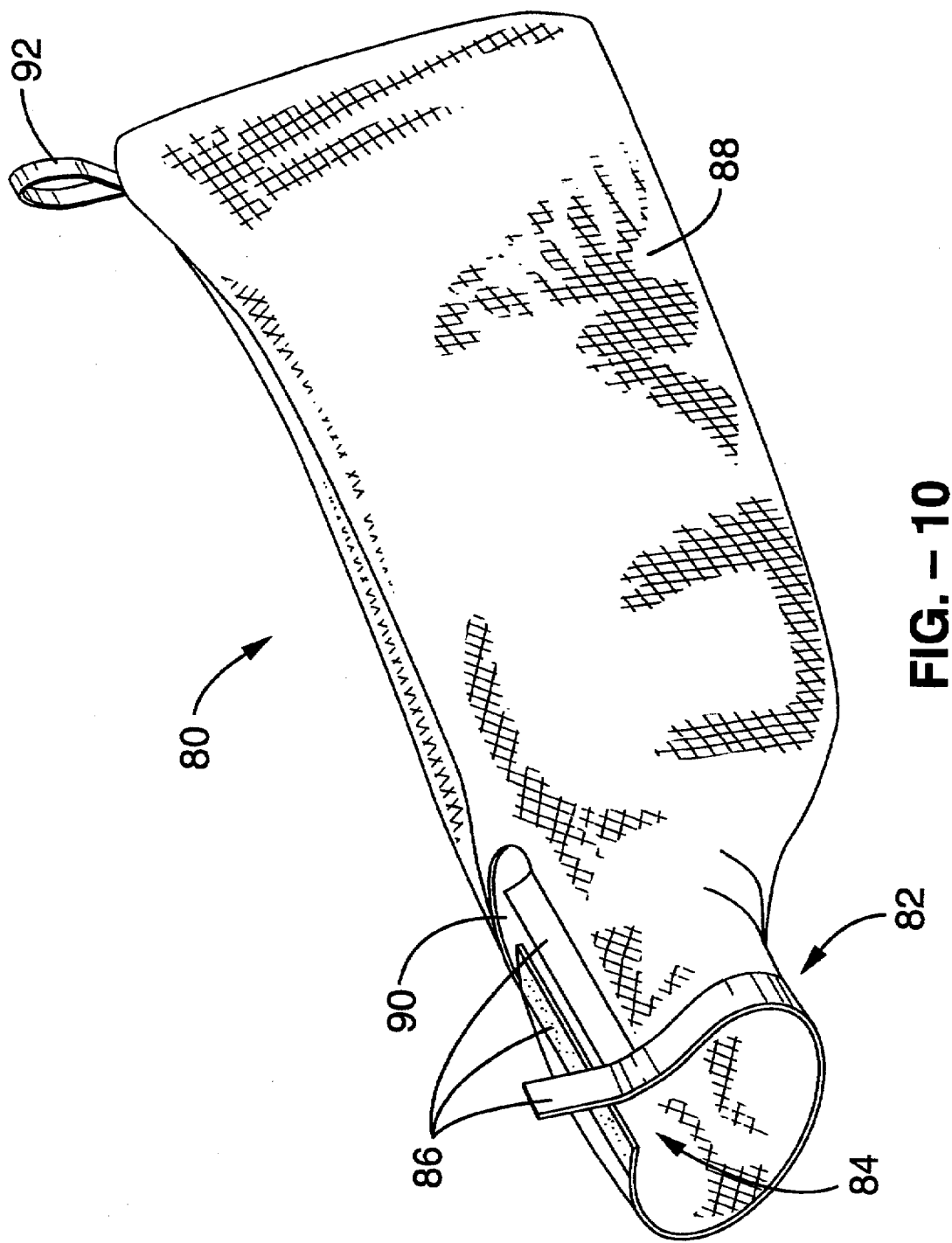
FIG. 10 is a perspective view of the debris bag used in the vacuum mode.

In vacuum mode 78, air is drawn in a proximal direction, i.e. vertically, inward through air duct 62, through fan shroud 42, and into debris bag 80. Debris bag 80 is preferably constructed of woven textile fabric, as is known in the vacuum cleaner art. As shown in FIGS. 2 and 10, distal collector portion 82 of bag 80 wraps around and covers struts 26, and binds securely around proximal rim 38 of fan shroud 42. A longitudinal seam 84, made releasably sealable with mating strips of hook and loop fabric 86 assures secure engagement and, at once, makes bag 80 very easy to open wide while dumping the contents of its receptacle portion 88. A small aperture 90 at the proximal end of seam 84, wraps and seals around shaft housing 12. A suspension strap 92 permits receptacle portion 88 to hang from shaft housing 12's mid-length.

Thus, in accordance with the foregoing, the apparatus may be easily switched back and forth between its blower mode 10 and vacuum mode 78. And, it can be just as easily converted to either from its conventional string trimmer configuration, as well. In doing so, collar bracket 20 may conveniently remain in place on shaft housing 12 for even easier conversion a second time.

A kit for so converting a conventional string trimmer is also envisioned herein. A first embodiment of that kit is for converting a trimmer to the blower mode 10, and would include collar bracket 20, struts 26, fan shroud 42, curved air duct 62, and at least one of, but preferably one of each of, fans 46 and 48. A kit for converting a trimmer to the vacuum mode 78 would include all of the above, as well as debris bag 80.

The foregoing detailed disclosure of the inventive blower 10 and vacuum 78 are considered as only illustrative of the preferred embodiments of, and not limitations upon the scope of, the invention. Those skilled in the art will envision many other possible variations of the structures disclosed herein that nevertheless fall within the scope of the following claims. For example, slight modifications of the general elements of the invention will permit this apparatus to be used for converting string trimmers of the straight-shafted variety. And, other appliances having a distal power take-off disposed at the end of a shaft might also be able to be converted for blower or vacuum use with the inventive kit herein.

And, alternative uses for these inventive appliances may later be realized. Accordingly, the scope of the invention should be determined with reference to the appended claims, and not by the examples which have herein been given.

We claim:

1. A string trimmer convertible alternatively to a blower and a vacuum, comprising in combination:
   a. a string trimmer, wherein said trimmer has a power shaft with opposing proximal and distal ends, a power-providing unit disposed upon said proximal end of said shaft, and a string head coupling disposed on said distal end of said shaft;
   b. a conversion kit comprising:
      i. a collar bracket;
      ii. a strut;
      iii. a fan shroud;
      iv. a curved air duct;
      v. a first fan;
      vi. a second fan, said second fan having blades pitched oppositely to blades of said first fan; and,
      vii. a bag.

2. Air conducting apparatus, comprising:
   a. a string trimmer, wherein said trimmer has a power shaft with opposing proximal and distal ends, a power-providing unit disposed upon said proximal end of said shaft, and a string head coupling disposed on said distal end of said shaft;
   b. means for propelling air, said air propelling means being adapted to engage said coupling;
   c. means for shrouding said air propelling means;
   d. means for supporting said shrouding means upon said shaft in coaxial relation thereto;
   e. means for directing air propelled by said air propelling means, said air directing means being coaxially engaged with said shrouding means, wherein said air directing means has an open distal end curved radially away from an axis common to said shrouding means and a proximal portion of said air directing means; and,
   f. means for permitting said air directing means to rotate in relation to said shrouding means, whereby said proximal portion of said air directing means remains coaxial with said shrouding means during such rotation, but whereby said distal end of said air directing means may be directed in alternative radial directions away from said common axis.

3. The apparatus of claim 2, wherein said shrouding means is relatively rigid, and wherein said air directing means is relatively flexible.

4. Air conducting apparatus, comprising:
   a. a string trimmer, wherein said trimmer has a power shaft with opposing proximal and distal ends, a power-providing unit disposed upon said proximal end of said shaft, and a string head coupling disposed on said distal end of said shaft;
   b. means for propelling air and debris in a proximal direction, said air propelling means being adapted to engage said coupling;
   c. means for shrouding said air propelling means;
   d. means for supporting said shrouding means upon said shaft in coaxial relation thereto;
   e. means proximal to said shrouding means for collecting and retaining said debris;
   f. means for directing air, said air directing means being distal to said shrouding means; and,
   g. means engageable with said air conducting apparatus, for supporting said air conducting apparatus a fixed distance above a surface over which said air conducting apparatus is passed.

5. The apparatus of claim 4, wherein said supporting means includes a wheel projecting distally beyond the distal-most extent of said air conducting apparatus.

6. The apparatus of claim 4, wherein said supporting means is engageable with said shrouding means.

7. The apparatus of claim 4, wherein said supporting means is engageable with said air directing means via said air directing means.

8. Air conducting apparatus, comprising:
   a. a string trimmer, wherein said trimmer has a power shaft with opposing proximal and distal ends, a power-providing unit disposed upon said proximal end of said shaft, and a string head coupling disposed on said distal end of said shaft;
   b. an axial fan adapted to engage said coupling;
   c. a plurality of struts engageable with said shaft in a radial orientation with respect to the axis of said shaft, adjacent said shaft's distal end;
   d. a circular fan shroud mountable upon said struts to surround said fan; and,
   e. an air duct removably engaged with said shroud in distal and concentric relation thereto.

9. The apparatus of claim 8, further including a concentric annular safety guard disposed proximal to said fan shroud and secured to said struts.

10. The apparatus of claim 8, wherein said struts are engageable with said shaft by means of a collar bracket, said collar bracket being engageable with said shaft, and also being engageable with said struts.

11. The apparatus of claim 8, wherein said struts have proximal ends adjacent said shaft and distal ends adjacent said fan shroud, and wherein said fan shroud may be selectively engaged with said struts' distal ends over a range of positions closer to, or farther from, said struts' proximal ends.

12. The apparatus of claim 8, wherein said fan shroud is relatively rigid, and wherein said air duct is relatively flexible.

13. The apparatus of claim 8, wherein said air duct has a curved distal end, and wherein said duct is able to be rotated with respect to said fan shroud, on an axis common with said fan shroud, such that said duct's distal end directs air in different radial directions with respect to said common axis.

14. The apparatus of claim 8, wherein said fan has blades pitched so as to conduct air in a distal direction.

15. The apparatus of claim 8, wherein said fan has blades pitched so as to conduct air in a proximal direction.

16. The apparatus of claim 15, further including debris retaining means disposed proximal to said fan.

17. The apparatus of claim 16, wherein said debris retaining means comprises:
   i. a collector portion coaxially engaged with said fan shroud's proximal rim, substantially covering said collar bracket and said struts, and substantially sealed around said shaft;
   ii. a receptacle portion in communication with said collector portion; and, iii. means for suspending said receptacle portion from said trimmer's shaft, said means being disposed between said collar bracket and said shaft's proximal end.

18. The apparatus of claim 17, wherein said collar bracket is generally frusto-conical in shape, and tapered from a smaller to a larger cross-section in a distal to proximal direction, whereby debris flowing toward said debris retaining means over said collar bracket is discouraged from being retained thereupon.

19. The apparatus of claim 8, wherein said air duct is generally frusto-conical, a proximal rim opening thereof having a larger diameter than a distal end opening thereof, but wherein said duct is curved so that the plane across said duct's proximal rim is nonparallel to the plane across said duct's distal end.

20. The apparatus of claim 19, wherein, due to the curvature of said duct, the length of one side thereof between said proximal and distal openings is longer than that along an opposing side thereof, and wherein a caster able to swivel through a 360° arc is mounted in a first position at a distal-most edge of said longer side of said duct, whereby, when said duct is lowered toward a surface such that the plane of said duct's distal rim is parallel to the surface said caster engages said surface, and wherein said caster may be selectively mounted in a second position at said distal-most edge of said longer side of said duct, whereby when said duct is lowered toward said surface such that the plane of said duct's distal rim is generally perpendicular to said surface, said caster also engages said surface.

21. The apparatus of claim 8, further including means in said air duct for directing air linearly out of said duct.

22. The apparatus of claim 21, wherein said air directing means comprises a baffle plate disposed in a distal end of said air duct.

* * * * *